Figure 1:
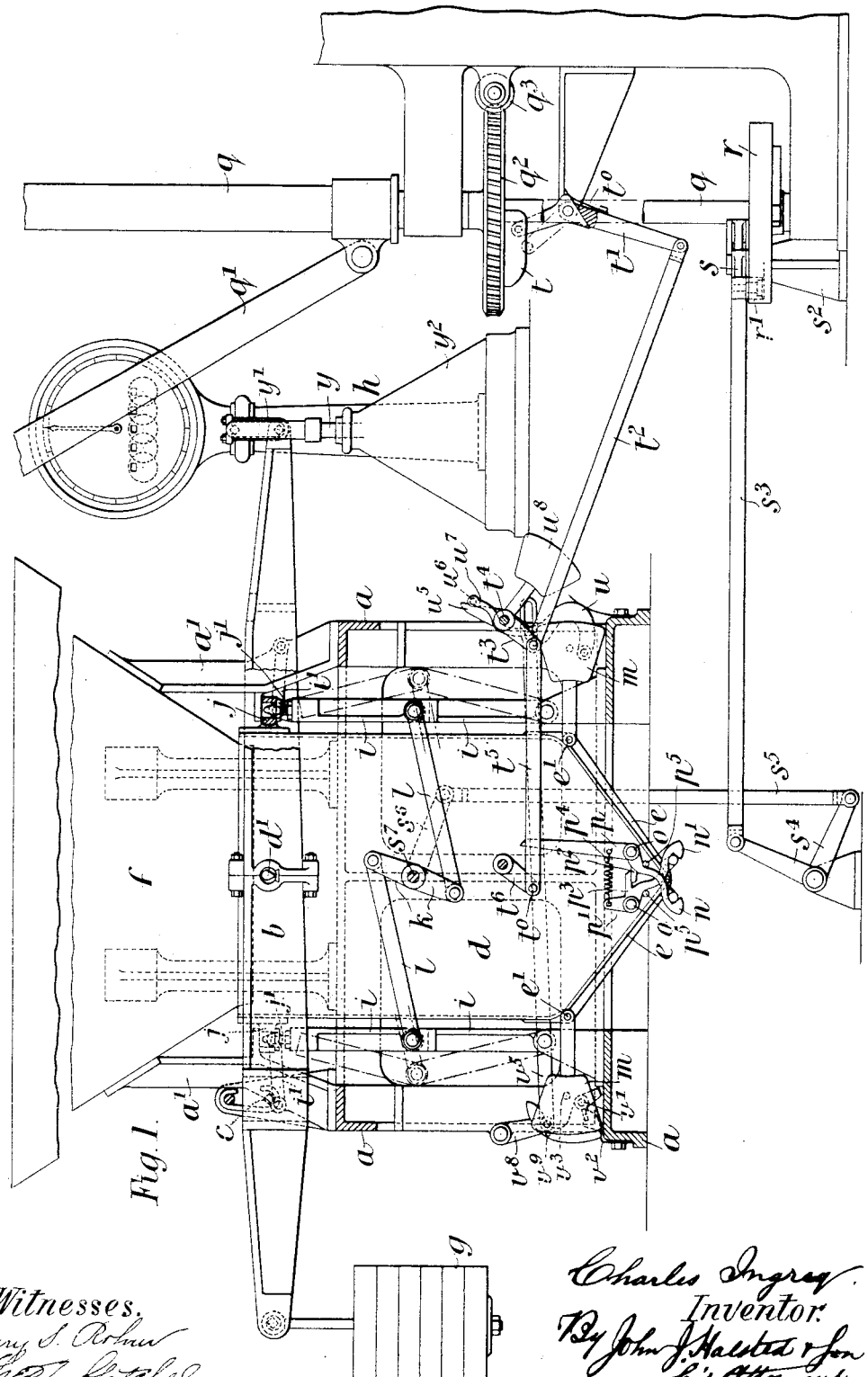

No. 607,855. Patented July 26, 1898.
C. INGREY.
WEIGHING AND RECORDING APPARATUS FOR COAL.
(Application filed Dec. 11, 1896.)
(No Model.) 5 Sheets—Sheet 1.

No. 607,855. Patented July 26, 1898.
C. INGREY.
WEIGHING AND RECORDING APPARATUS FOR COAL.
(Application filed Dec. 11, 1896.)
(No Model.) 5 Sheets—Sheet 3.
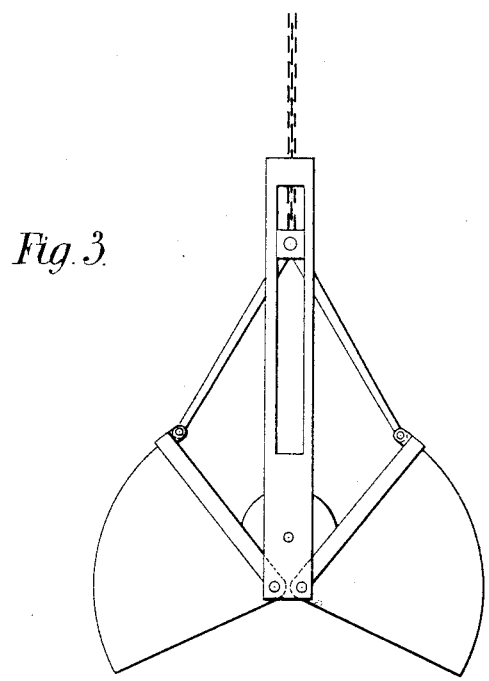
Fig. 3.
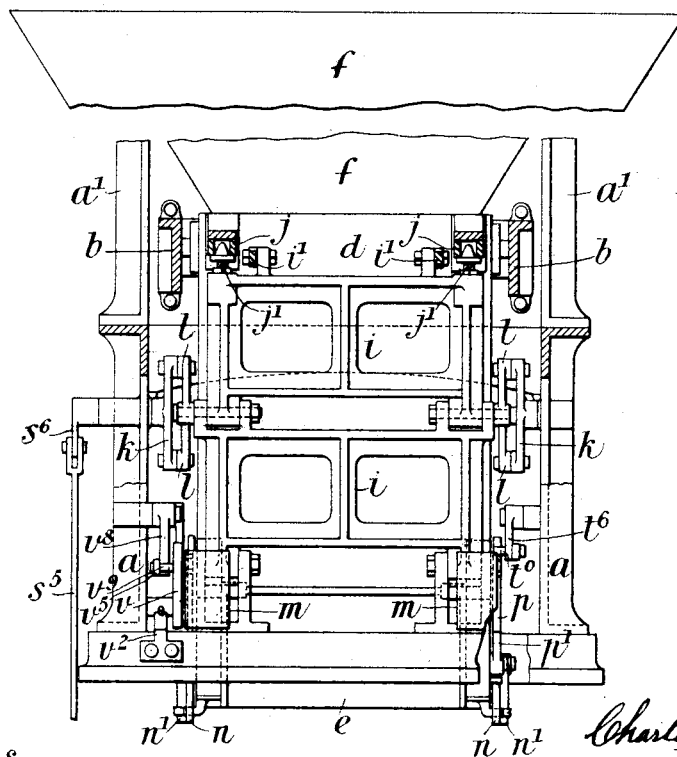
Witnesses. Charles Ingrey, Inventor.

No. 607,855. Patented July 26, 1898.
C. INGREY.
WEIGHING AND RECORDING APPARATUS FOR COAL.
(Application filed Dec. 11, 1896.)
(No Model.) 5 Sheets—Sheet 4.
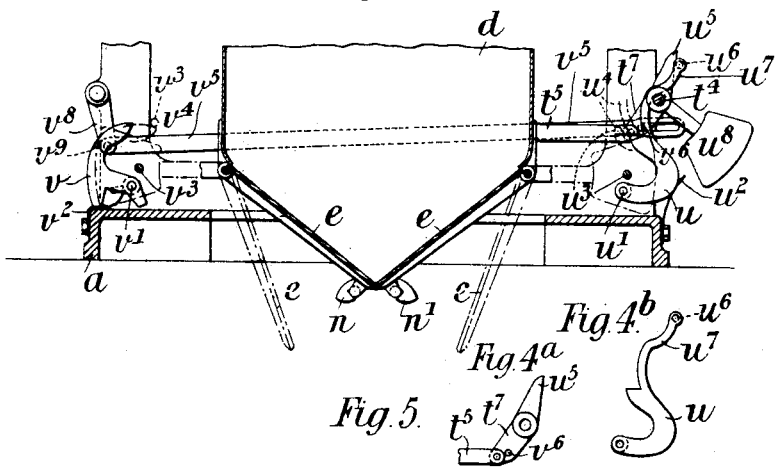
Fig. 4.
Fig. 4a. Fig. 4b.
Fig. 5.
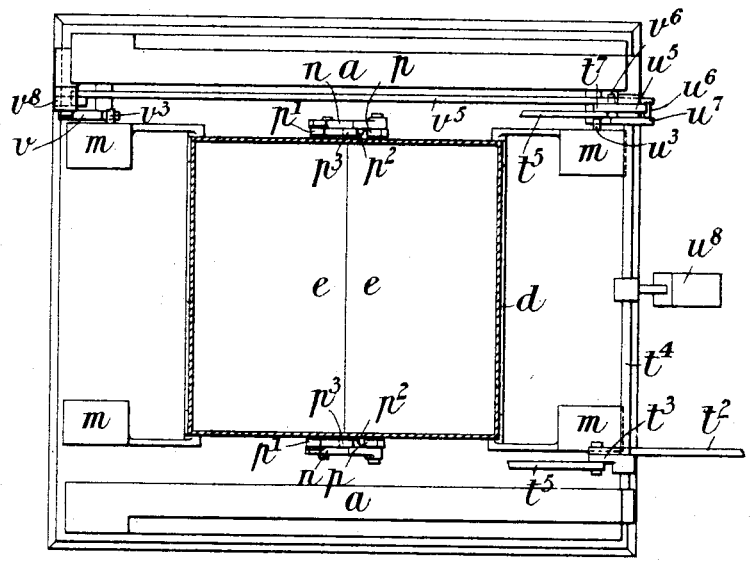
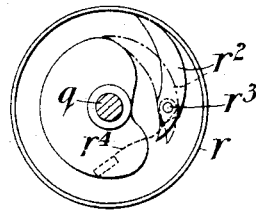
Fig. 6.
Witnesses.
Charles Ingrey.
Inventor.
By John J. Halsted & Son
his Attorneys.

No. 607,855. Patented July 26, 1898.
C. INGREY.
WEIGHING AND RECORDING APPARATUS FOR COAL.
(Application filed Dec. 11, 1896.)
(No Model.) 5 Sheets—Sheet 5.
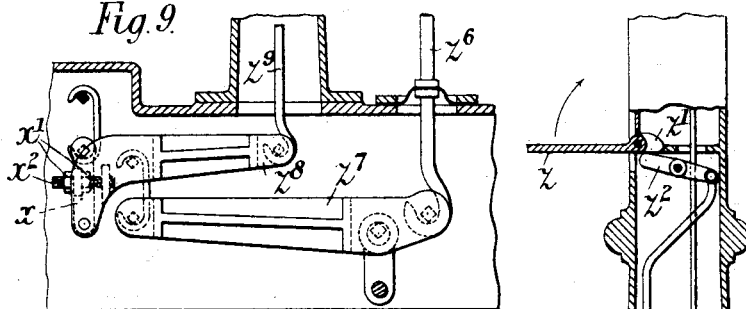
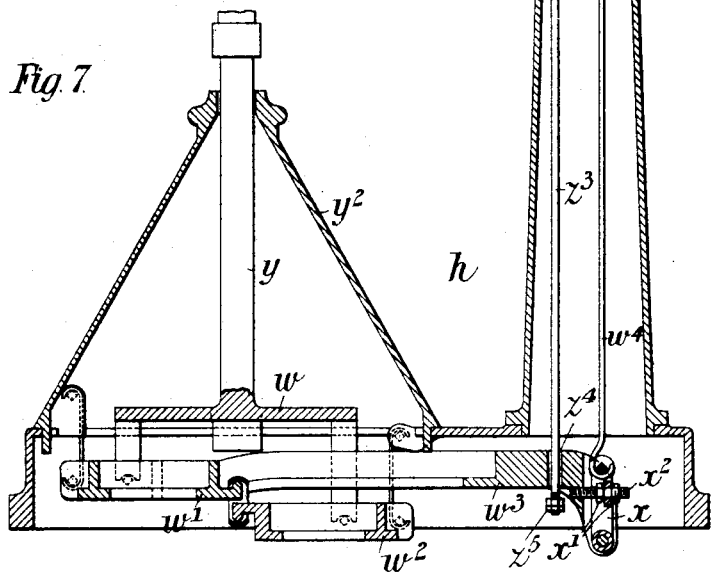
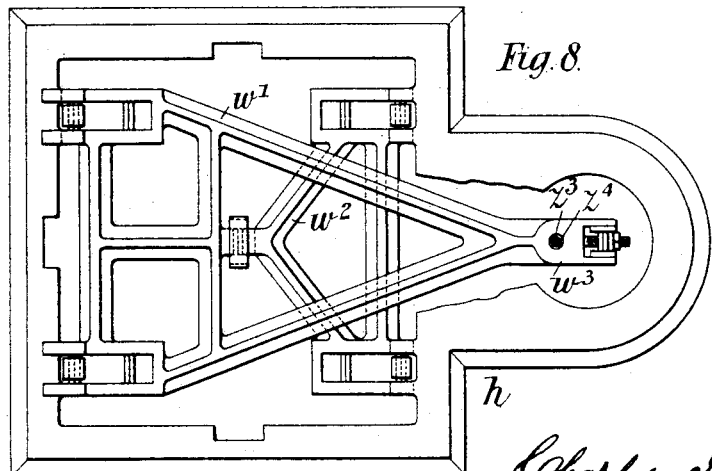
Witnesses.
Charles Ingrey, Inventor.
By John J. Halsted & Son
his Attorneys

UNITED STATES PATENT OFFICE.

CHARLES INGREY, OF LONDON, ENGLAND.

WEIGHING AND RECORDING APPARATUS FOR COAL.

SPECIFICATION forming part of Letters Patent No. 607,855, dated July 26, 1898.

Application filed December 11, 1896. Serial No. 615,350. (No model.)

*To all whom it may concern:*

Be it known that I, CHARLES INGREY, A. M. I. C. E., a subject of the Queen of Great Britain, residing at London, England, have invented new and useful Improvements in Weighing and Registering Apparatus for Coal and other Materials, of which the following is a specification.

My invention relates to an improved apparatus for automatically weighing coal and other material and for registering the weight thereof, and has for its object the production of a simple and effective means of obtaining the desired result without the objections which exist with machines such as have hitherto been employed or attempted to be employed. In such machines it has been found in dealing with, say, coal as delivered in constantly-varying loads by a crane that if the receptacle into which it is received is only supported in a weigh-beam by knife-edge centers the proper balance cannot always be maintained, and therefore the correct weight cannot be obtained. It has also been found in practice that in apparatus for registering the results of successive operations of a heavy weighing-machine there is a tendency to produce many false movements in the registering-gear by reason of vibration and other causes, and as a consequence to give inaccurate results. I am aware that attempts have been made to overcome the former objection by causing the receptacle to be at rest upon supports during the time the coal is being received; but in such cases it has been necessary to employ hydraulic or other power to raise the dead-weight of the receptacle, the weigh-beam, and the heavy counterbalance in addition to the load of coal.

Now the object of my invention is to obviate the necessity for raising the weight of the receptacle and beam, which are accurately counterbalanced upon knife-edge centers, so that a very small amount of power is required to perform the operation of weighing, and to construct the registering apparatus in such a manner that it will accurately record all the varying loads.

In carrying out my invention I provide a fixed hopper having beneath it a skip or receptacle which is provided with a door or doors at the bottom, the said receptacle being carried by knife-edge centers upon a weigh-beam, which is itself mounted upon knife-edge centers and is weighted at one end, so that the receptacle when empty, the beam, and parts in connection therewith are accurately balanced. In connection with the said receptacle are toggle frames or levers, which operate in conjunction with lugs on the receptacle to support the same normally and while the coal is being received. The doors at the bottom of the receptacle are hinged and provided with catches for retaining them in their closed position and devices for holding them in their open position.

The registering apparatus which I advantageously employ with my improved weighing apparatus, but which may be used in combination with other weighing-machines, has compound levers in connection with which the end of the weigh-beam operates, the said compound levers being connected with a weigh-rod the movement of which operates pointers or dials. I provide one of the compound levers with an adjusting device, whereby the amount of leverage can be accurately adjusted and the register calibrated, so that the weight of coal in the receptacle is correctly indicated. I provide for throwing the register out of gear, so that when the weighing-machine is not in use the register cannot be operated.

To enable my invention to be fully understood, I will describe the same by reference to the accompanying drawings, in which—

Figure 2:
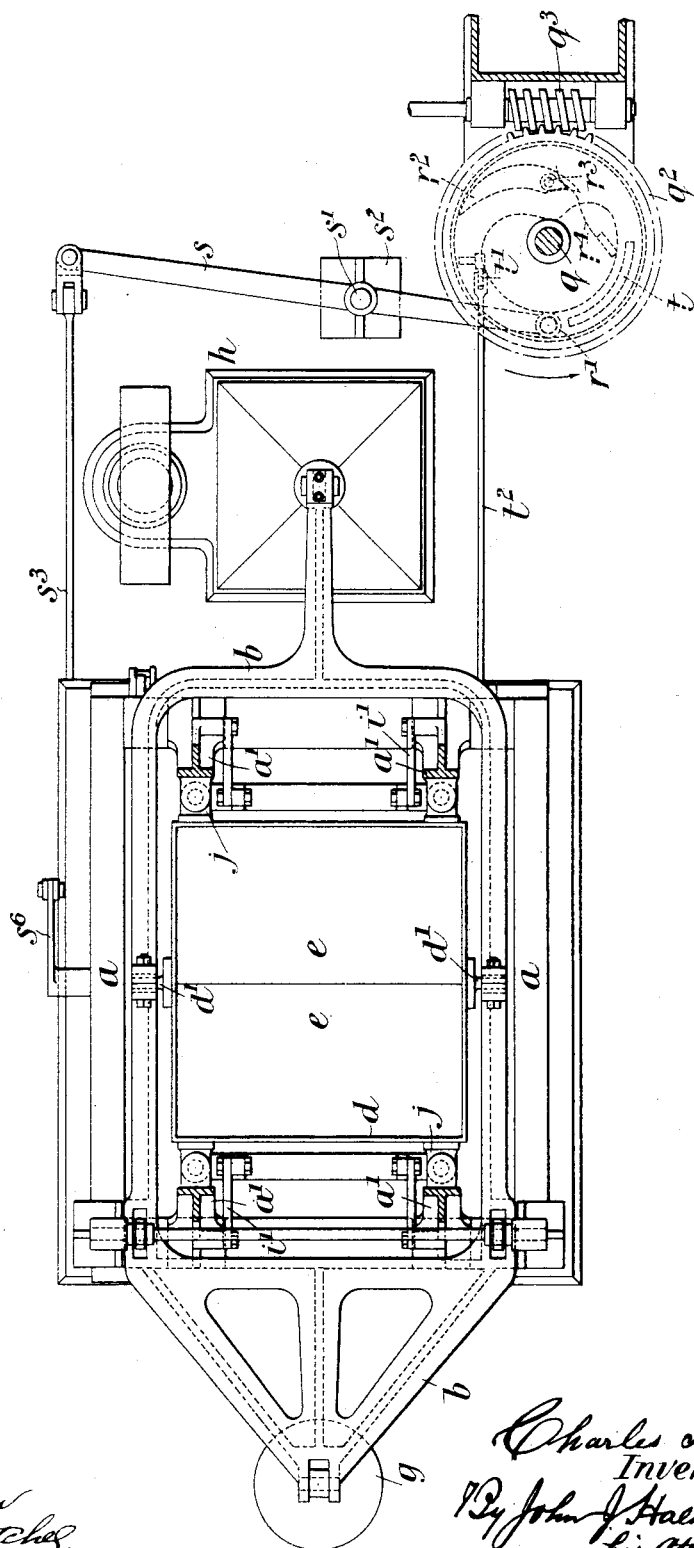

Figure 1 is a sectional side elevation of my improved weighing and registering apparatus, and Fig. 2 is a plan view of the same with the hopper removed. Fig. 3 is a sectional end elevation. Fig. 4 is a sectional elevation showing the mechanism for holding the doors open; Fig. $4^a$, a detail showing a plan of certain links, rods, and levers; Fig. $4^b$, a detail showing the dog for holding up the weight of the right-hand door. Fig. 5 is a plan view of the same. Fig. 6 is a view of a cam hereinafter described. Fig. 7 is a sectional side elevation of the registering mechanism, and Fig. 8 is a sectional plan of the same. Fig. 9 is a sectional side elevation illustrating a modification in connection with the registering mechanism.

Similar letters of reference illustrate corresponding parts in the several figures.

$a$ is the framing of the weighing apparatus, and $b$ is the weigh-beam, mounted thereon by means of the knife-edges $c\ c$. This weigh-beam is in the form of a frame, having parallel sides, as shown, and in which the weighing-receptacle is located and carried or supported. $d$ is the skip or weighing-receptacle, carried in the said beam by the knife-edges $d'\ d'$ and having at the bottom the hinged doors $e\ e$.

$f$ is the hopper, mounted above the receptacle $d$ and carried by brackets $a'\ a'$ on the frame $a$.

$g$ are the balance-weights, mounted upon a pendulous rod at one end of the weigh-beam, and $h$ is the registering apparatus, connected to the opposite end of the beam.

$i\ i$ are pairs of toggle frames or levers, (clearly shown in Fig. 3,) which at their lower ends are directly pivoted to brackets on the framing $a$ and at their upper ends connected by links $i'\ i'$ to the said framing, the said links serving to retain the upper ends of the toggle-frames in position relatively with lugs $j\ j$ on the receptacle $d$ in such a manner that when the said toggle-frames are straight, as shown in Fig. 1, the said toggle-frames will bear against the under sides of the said lugs and lift the receptacle $d$ sufficiently to take the pressure (due to its weight) of the knife-edges $d'\ d'$ off the weigh-beam, while when the said toggle-frames are bent—for instance, as indicated by the dotted lines in Fig. 1—the receptacle will rest with the said knife-edges $d'\ d'$ upon the weigh-beam.

In practice screw-studs $j'\ j'$, with conical heads, are applied to the toggle-frames, so as to permit of insuring that the said frames shall make simultaneous contact with all the lugs $j\ j$. The conical heads of the screw-studs $j'\ j'$ enter holes in the lugs $j\ j$, as clearly shown in Figs. 1 and 3, and serve to retain the receptacle in its proper position relatively with the toggle-frames. The toggle-frames $i\ i$ are simultaneously operated from both sides of the framing by the levers $k\ k$ and the links $l\ l$.

With the arrangement of toggle-levers hereinbefore described it will be understood that when the toggle-frames are straight the receptacle is supported rigidly in position, so that no load comes upon the knife-edges $d'\ d'$. When the coal or other material has been received, the said toggle frames or levers are caused to move out of their normal upright position, so that the receptacle is lowered until the weight is entirely carried by the weigh-beam when the operation of weighing is performed, the movements of the beam being transmitted to the register. When the weight has been recorded, the toggle-frames are moved to restore them to their vertical position, thereby lifting the receptacle.

The doors $e\ e$ at the bottom of the receptacle are pivoted at $e'\ e'$ and are provided with counterweights $m\ m$, which serve to close the doors when no weight is upon them. $n\ n'$ are the catches for retaining the doors closed and releasing them at the proper time to discharge the load. These catches $n\ n'$ (of which there are two sets, but only one of which is described) are pivoted to the weighing-receptacle at $o\ o$ and are respectively provided with lever arms or extensions $p\ p'$ and with lugs $p^2\ p^3$. A spring $p^4$ connects the two lever-arms $p\ p'$ and serves to draw the catches into their locking position and in contact with the two stop-pins $p^5\ p^5$. With this arrangement it will be understood that when the lever $p$ is moved to disengage the catch $n$ the corresponding catch $n'$ is also moved through the medium of the lugs $p^2\ p^3$. When the said lever $p$ is released, the spring $p^4$ returns the parts to their normal positions.

The necessary motions for operating the toggle-frames and door opening and closing devices may be performed by hand; but in practice I prefer that the necessary movement should be communicated from a crane or from the motor employed to operate the crane and to so arrange the mechanism that the weighing apparatus can only be put into action after a load has been delivered. Suitable mechanism is shown in the drawings, $q$, Figs. 1 and 2, indicating a crane-post, $q'$ the jib, and $q^2\ q^3$ a worm-wheel and worm, respectively, through the medium of which the swinging or turning of the crane is effected by the driving-motor. (Not shown.)

$r$ is a cam, (shown detached in Fig. 6,) which cam acts upon the roller $r'$ of a lever $s$, pivoted at $s'$ upon a bracket $s^2$ and connected by a rod $s^3$ with one arm of a bell-cranked lever $s^4$, the other arm of which is connected by a rod $s^5$ with a lever-arm $s^6$, fixed to a shaft $s^7$, upon which one of the levers $k$ for operating the toggles is mounted. As shown in Figs. 1, 2, and 3, the cam $r$ is formed so that when the cam is rotated in the direction of the arrow, Fig. 2, the roller $r'$ will run through a heart-shaped path, while when the cam is rotated in the reverse direction the roller will be in a circular path, so that no movement will be imparted to the lever. This variation of the cam-path is effected by the employment of a switch $r^2$, pivoted at $r^3$ and normally held by a spring $r^4$, so that at one end it is in contact with the outside of the circular path. It will be obvious that when the cam runs in the reverse direction to that indicated by the arrow in Fig. 2 the switch will automatically move under the action of the roller behind it into the position indicated by the dotted lines in the said figure and, when it has passed the roller, spring outward to the normal position. When, however, the cam rotates in the direction of the arrow, it will be obvious that the switch will divert the roller from the circular path. The said cam is so arranged relatively with the toggle-frames that so long as the roller is in the circular path of the cam no movement is imparted to the said toggle-frames, the latter remaining in their normal position. (Indicated by the full lines in Fig. 1.) When, however, owing to the rotation of the cam the roller is moved out of the circular path, the toggle-frames will be moved to the position indicated in dotted lines in Fig. 1 to lower the receptacle $d$ onto the weigh-beam $b$. The cam in practice is so fixed relatively with the jib of the crane that when the latter is in position for the grab to hang immediately over the receptacle the toggle-frames will be upright and that as the crane is turned round to pick up a fresh load the cam will operate to bend the toggle-frames, so that the weighing will take place.

The automatic operation of the catches to release the doors is effected by a cam-surface $t$ on the worm-wheel $q^2$, Figs. 1 and 2. This cam-surface $t$ acts upon a lever $t'$, connected by a link $t^2$ to an arm $t^3$ on a shaft $t^4$, having bearings in the framing $a$. The arm $t^3$, which is at one end of the shaft $t^4$, as clearly shown in Fig. 5, is connected by a rod $t^5$ with a link $t^6$, Fig. 1, depending from a pivot on the framing $a$ in such a position that when under the action of the cam $t$ the lever $t'$ is operated the said link $t^6$ will be pulled from the position indicated in Fig. 1, so as to make contact by a pin $t^0$ thereon with the arm $p$ of the catch $n$ to disengage the catches $n$ $n'$ and release the doors. In order that the catches at each side of the receptacle shall operate simultaneously, the shaft $t^4$ carries at the opposite end to that upon which the lever $t^3$ is mounted another lever $t^7$, (shown detached in Fig. 4$^a$,) connected with a rod and link $t^5$ $t^6$, similar to the rod and link $t^5$ $t^6$ of the lever $t^3$ for operating the other set of catches.

As hereinbefore stated, the doors $e$ $e$ are provided with counterweights $m$ for automatically closing them when the receptacle is emptied. To prevent these counterweights from prematurely closing the doors before the contents of the receptacle are completely discharged, I provide for momentarily holding up the counterweights $m$ $m$ when the doors are opened. This I accomplish by the following means: For holding up the weight $m$ of the right-hand door, Fig. 4, I provide a dog $u$, (shown detached in Fig. 4$^b$,) pivoted to the framing at $u'$ and acted upon by a spring $u^2$ to press the dog forward into engagement with a pin $u^3$ upon the said weight when it is lifted. The dotted lines at $u^4$, Fig. 4, show the position of the pin $u^3$ and the tooth of the dog when the weight is in its lifted position. To draw the dog out of engagement with the pin $u^3$ against the pressure of the spring $u^2$, I provide the lever $t^7$ with an extension $u^5$, which when the shaft $t^4$ moves backward after the catches are released, owing to the movement of the cam $t$ past the end of the lever $t'$, acts against a pin $u^6$ on an upper extension $u^7$ of the dog $u$ and presses the same backward to the position indicated in full lines in Fig. 4. The weight $u^8$, fixed on an arm on the shaft $t^4$, serves to assist this disengaging movement of the dog against the pressure of the spring $u^2$. In order that a similar holding of the weight $m$ of the left-hand door may be effected, I pivot a dog $v$, similar to the dog $u$, to the framing at $v'$, and I arrange a spring $v^2$, which tends to move the dog forward to engage beneath the pin $v^3$, on the weight, as indicated by the dotted lines at $v^4$ in Fig. 4. The disengagement of the dog $v$ from the pin $v^3$ to allow the weight to drop is effected through the medium of a rod $v^5$, operated at one end by a pin $v^6$ on the lever $t^7$ and connected at the other end to a depending link $v^8$, which when the rod $v^5$ is moved longitudinally during the disengagement of the dog $u$ from the pin $u^3$ impinges against a pin $v^9$ on the dog $v$ and moves the said dog backward out of engagement with the pin $v^3$. As the movement of the lever $t^7$ is greater than the movement allowed to the rod $v^5$ under the action of the spring $v^2$ of the dog $v$, the end of the rod $v^5$, with which the pin $v^6$ engages, is slotted, as shown in Fig. 4, to allow the additional movement of the lever $t^7$. With this arrangement it will be understood that when the shaft $t^4$ is rotated under the action of the cam $t$ to operate the catches $n$ $n'$ to release the door the lever extension $u^5$ will be moved, so as to allow the dogs $u$ $v$, under the action of their springs, to spring into the paths of the pins $u^3$ $v^3$ of the balance-weights $m$ $m$ of the doors, so that when the said weights are in their upper positions the dogs will engage beneath the said pins to hold the doors open. When the load has been discharged, the shaft $t^4$ commences to return in the opposite direction under the action of the weight $u^8$, owing to the disengagement of the cam $t$ from the lever $t'$ the extension $u^5$ of the lever $t^7$, by acting against the pin $u^6$ on the extension $u^7$ of the dog $u$, disengages the latter from its pin $u^3$, and at the same time the dog $v$ is disengaged from the pin $v^3$, owing to the movement of the rod $v^5$ under the action of the lever $t^7$, causing the link $v^8$ to impinge against the pin $v^9$. The upper end of the lever $t'$ is pivotally connected to the other part thereof, as indicated in Fig. 1, so as to permit of the cam passing the lever $t'$ without moving it in the backward movement of the crane, the said upper end yielding against the pressure of a spring $t^8$.

It is to be understood that the positions of the cams $r$ and $t$ relatively with one another are such that the cam $r$ will first operate to bend the toggle-frames to allow the weighing of the load and commence to again straighten the toggles prior to the operation of the cam $t$ for discharging the load, this arrangement insuring that the weight of the receptacle is practically resting upon the toggle-frames before the vibration due to the discharge of the load takes place.

The recording apparatus $h$ comprises a series of levers similar to those of an ordinary weighing-machine, the various levers being proportioned to one another to correspond with the pressure which the weight of the load brings to bear upon the machine through the weigh-beam.

The construction of the registering apparatus will be clearly understood by reference to Figs. 7 and 8. In these figures, $w$ is the weighing-platform, which is supported upon the compound levers $w'$ $w^2$, the former of which is connected at one end $w^3$ by a rod $w^4$, the movement of which causes the deflection of a spring or springs or the raising of a weighted lever, motion communicated to which is communicated to a spindle, and thence to a train of wheels carrying the various pointers.

In practice I find it advantageous to arrange that the main pointer of the dial shall indicate decimals of a ton, the complete revolution of the pointer indicating one ton. A second or smaller dial will be used for indicating units of tons; a third, tens; a fourth, hundreds, and so on. In order to provide for adjusting the levers so that a complete revolution of the main pointer shall indicate one ton, I pivot to the end $w^3$ of the weighing-lever $w'$ an arm $x$, which by means of nuts $x'$ $x'$ upon a stud $x^2$ may be moved nearer to or farther from the fulcrum of the said lever $w'$.

In order to communicate the pressure of the weigh-beam to the platform $w$, the platform has formed upon it a standard $y$, Fig. 7, to the upper end of which the weigh-beam is connected by a link $y'$, as shown in Fig. 1. A conical cover $y^2$ is represented as being placed over the platform to inclose the same and to prevent as far as possible the admission of dust into the apparatus.

In order to prevent the movement of the registering apparatus when the weighing apparatus is not in use, I advantageously provide the following arrangement: On the standard of the register carrying the dials I mount a door $z$, adapted to cover the dials and to be locked. Adjacent to the hinge of this cover I form a cam $z'$, designed to operate against one end of a lever $z^2$, the other end of which carries a rod $z^3$, which depends through the hole $z^4$ in the end $w^3$ of the weighing-lever and carries on the under side thereof nuts $z^5$. When the registering apparatus is in use and the door $z$ is lowered to the position indicated in Fig. 7, so as to reveal the face of the registering apparatus, the nuts $z^5$ are so far below the under side of the end $w^3$ of the weighing-lever that they will not interfere with the motions thereof. When, however, the door is closed up in the direction of the arrow, Fig. 7, the cam $z'$, by acting upon the lever $z^2$, will lift the rod $z^3$ sufficiently to cause the nuts $z^5$ to make contact with the under side of the end $w^3$ of the weighing-lever and support the same.

In the foregoing description of the weighing mechanism I have assumed that the weight is registered by a downward pressure of the weigh-beam upon the platform $w$. If desired, however, the upward movement of the end of the weigh-beam carrying the weights $g$ may be utilized. In this arrangement a rod $z^6$, Fig. 9, which at its upper end can be attached to the weigh-beam, is at its lower end connected to one of a pair of weighing-levers $z^7$ $z^8$, the other lever of the pair being connected by a rod $z^9$ to the registering-dial. In this arrangement of levers, which will be clearly understood by reference to Fig. 9, I arrange the adjusting-arm $x$ upon the lever $z^8$, which is connected to the rod $z^9$ of the register. In this arrangement of the arm $x$ it serves for adjusting the distance between the fulcrum of the lever $z^8$ and the point at which the pull of the lever $z^7$ is communicated to it.

Having now particularly described and ascertained the nature of my said invention and in what manner the same is to be performed, I declare that what I claim is—

1. In a weighing-machine, a weigh-beam having an open frame extending all around the weighing-receptacle and provided with extensions at the opposite ends of such frame as set forth, combined with a weighing-receptacle having lugs thereon as described, and with toggle-levers not connected to, but serving to lift said receptacle by means of said lugs, above and entirely free from the weigh-beam and weighing devices, and to support it while receiving its load, and then serving to lower the receptacle with its load that it may again rest upon the knife-edges of the weigh-beam, all as set forth.

2. In combination with a supporting-frame having an oblong or square opening, a weigh-beam having a correspondingly-shaped opening and having projections at both ends for the purposes set forth, a weighing-receptacle having lugs $j$ thereon and adapted to be supported on knife-edges on said beam, and toggle-levers serving to lift the receptacle away from such knife-edges by the act of bearing against the under side of said lugs, thus temporarily relieving the weigh-beam and serving to support the receptacle while loading and then to lower it again onto the knife-edges of the weigh-beam for the purpose of weighing.

3. In a weighing-machine, a weighing-receptacle having lugs thereon, toggle-levers pivoted at their lower ends to brackets upon the main supporting-frame of the machine and at their upper ends connected by links to the frame, said links serving to retain the upper ends of the toggle-levers in position relatively with said lugs, and means substantially as set forth serving to straighten the toggles and thus lift the receptacles off the weigh-beam and to support it while filling the receptacle.

4. The described means for raising the receptacle away from and for lowering it to rest again upon the weigh-beam, comprising in combination the toggles for such lifting and lowering, the links $l$, each connected at one of its ends to one of the toggle-joints, shaft $s^7$, levers $k$ on said shaft and connected to the other ends of said links, lever-arm $s^6$ fixed to said shaft, rod $s^5$ connected to one end of said arm, bell-crank lever $s^4$ connected to the other end of said rod, rod $s^3$, connected at one end to lever $s^4$, lever $s$, connected at one end to rod $s^3$, cam $r$ for actuating said lever $s$, turning crane-post $q$, worm-wheel $q^2$ and worm $q^3$ for actuating the lever $s$ and its described connections.

5. In combination with the weigh-beam, the weighing-lever $w'$, the arm $x$ pivoted to one end of said lever, and the stud $x^2$ and its adjusting-nuts serving to adjust said arm relatively to the fulcrum of said lever, all substantially as shown and described.

6. The described means for closing the bottom doors, consisting of the combination with them, of weights $m$, catches $n$ $n'$ pivoted to the weighing-receptacle and provided respectively with arms $p$ $p'$ and with lugs $p^2$ $p^3$ as described, stop-pins $p^5$ and $p^6$, and a spring connecting said arms and serving to draw the catches into their locking position.

7. The described means for opening the doors to discharge the load, and for again closing and locking them, consisting in the combination with a cam-surface $t$ on a worm-wheel, of a lever $t'$ and link $t^2$ actuated by said wheel, arm $t^3$, rod $t^5$, link $t^6$ and its pin $t^0$, arms $p$ $p'$ and their catches $n$ $n'$, and lugs $p^2$ $p^3$, a spring connecting these levers, and counterweights $m$ on the doors.

CHARLES INGREY.

Witnesses:
G. F. REDFERN,
JOHN E. BOUSFIELD.